United States Patent [19]

McKeage

[11] 3,877,293
[45] Apr. 15, 1975

[54] PIPE TESTING SYSTEM
[75] Inventor: Roy A. McKeage, Bellbrook, Ohio
[73] Assignee: Price Brothers Company, Dayton, Ohio
[22] Filed: Dec. 18, 1972
[21] Appl. No.: 315,816

[52] U.S. Cl. .................................. 73/49.1; 73/49.5
[51] Int. Cl. ......................................... G01m 3/28
[58] Field of Search ............ 73/49.1, 49.5, 49.6, 40; 138/91, 104

[56] References Cited
UNITED STATES PATENTS

| 3,070,993 | 1/1963 | Rowell et al. | 73/49.5 |
| 3,350,920 | 11/1967 | Brauer | 73/49.1 |
| 3,388,588 | 6/1968 | Vincenot | 73/49.6 |
| 3,430,485 | 3/1969 | Henry, Jr. et al. | 73/49.6 |
| 3,566,675 | 3/1971 | Ledebur | 73/49.5 |
| 3,807,219 | 4/1974 | Wallskog | 73/40 |

FOREIGN PATENTS OR APPLICATIONS

| 283,110 | 2/1966 | Australia | 73/49.6 |

Primary Examiner—Richard C. Queisser
Assistant Examiner—Joseph W. Roskos
Attorney, Agent, or Firm—Biebel, French & Bugg

[57] ABSTRACT

A pipe testing system which includes a pair of opposed adapter plates which are clamped to the opposite ends of a pipe section to seal the interior of the pipe, and a manifold which permits an operator to apply, selectively, either a vacuum to the pipe interior or pressurize it with either air or water. Indicating lights are provided to indicate pressure drops during testing and a timer records the interval for a change in pressure of a given magnitude. Additionally, the system is adjustable to accommodate pipes of different lengths and diameters. The system is specifically designed to test pipe on a high volume basis and in this regard a runway having a pipe centering section is utilized to feed pipes to the test station.

15 Claims, 12 Drawing Figures

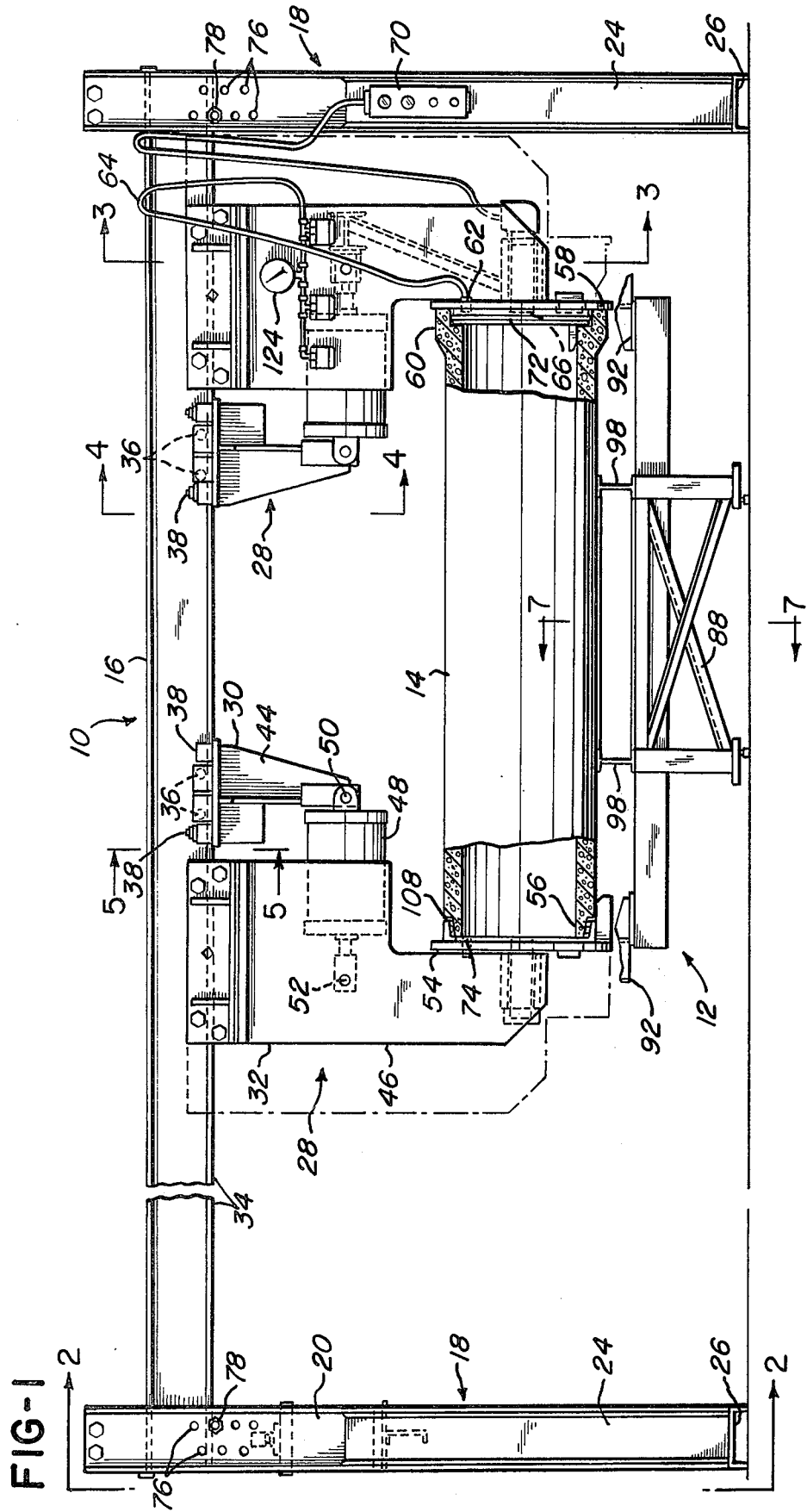

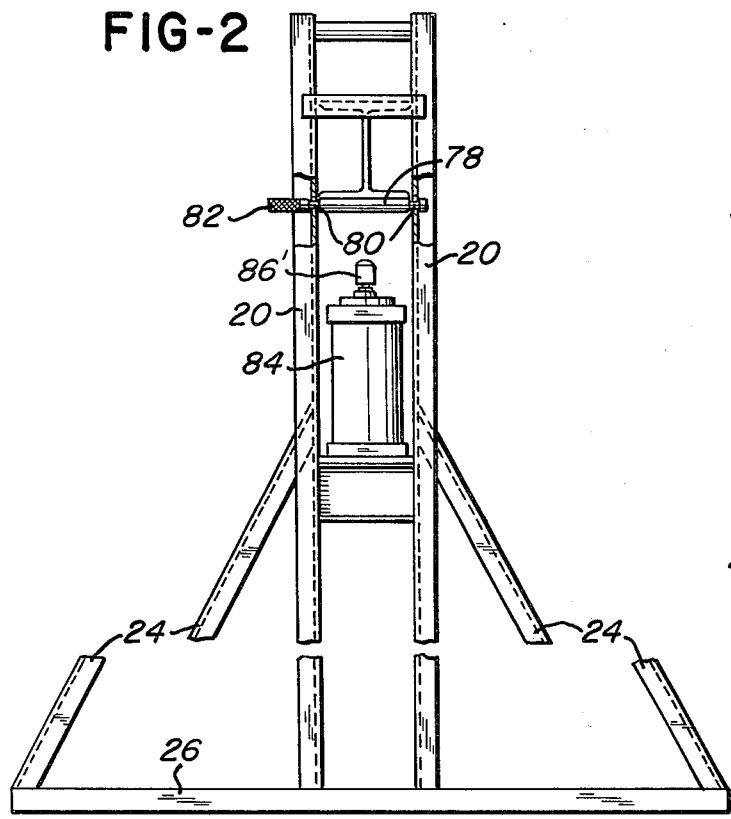
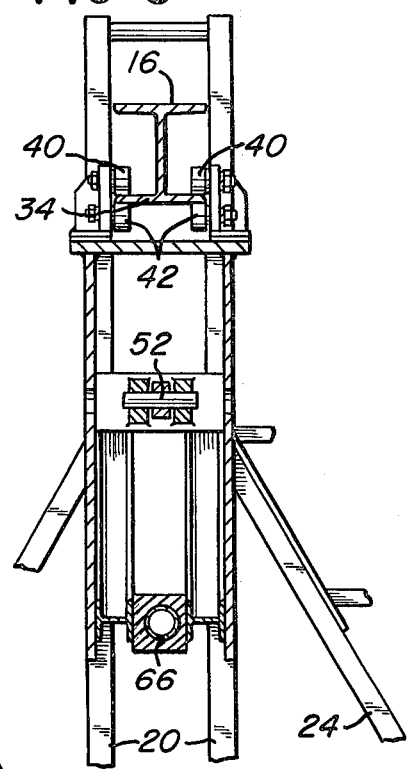
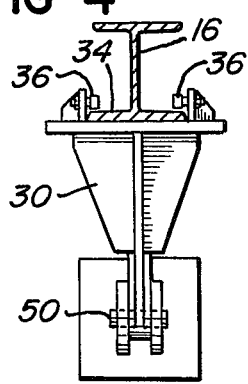
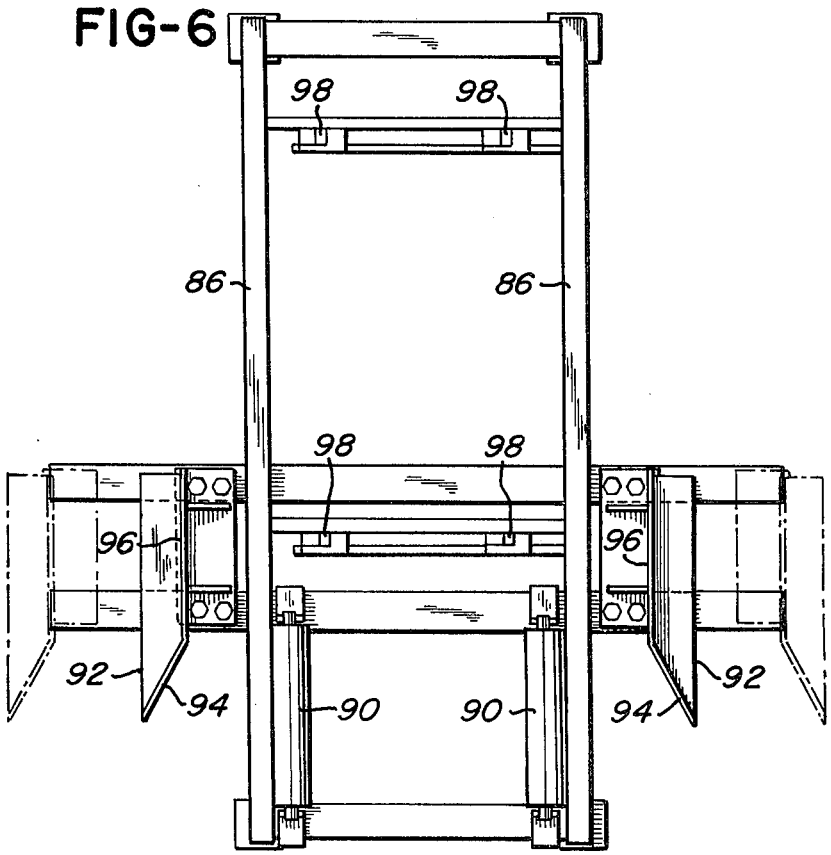
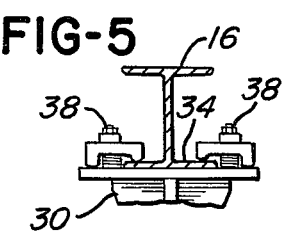

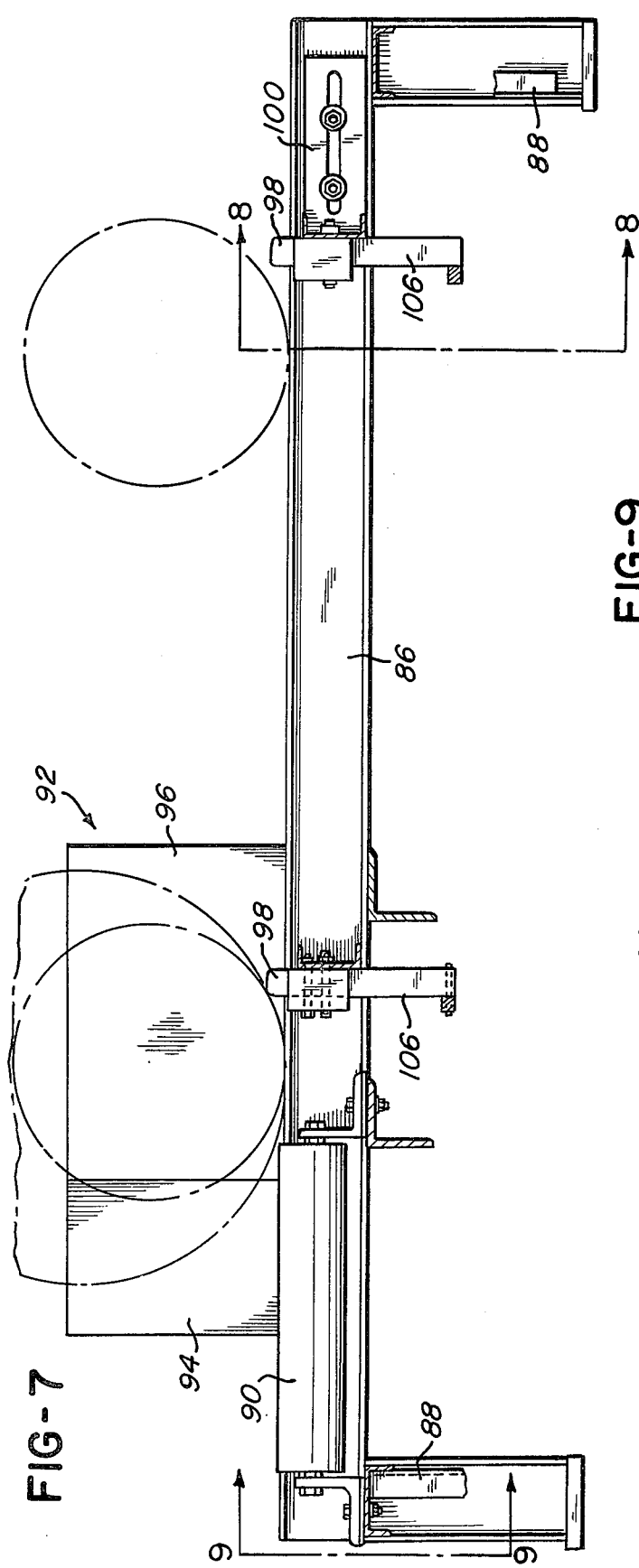
FIG-7
FIG-8
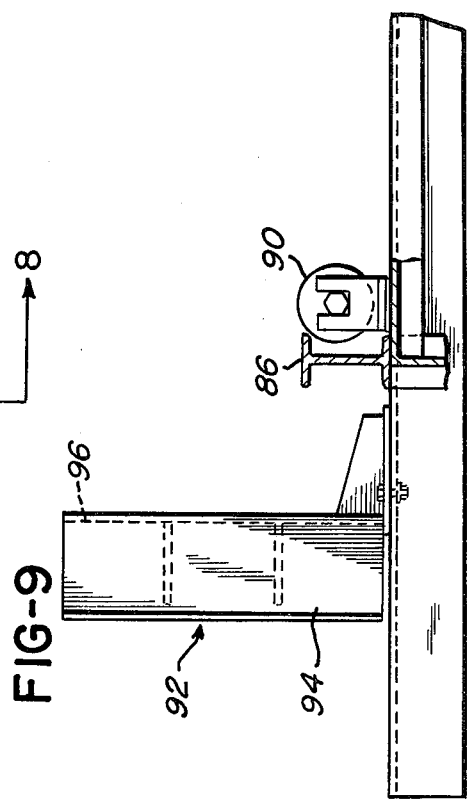
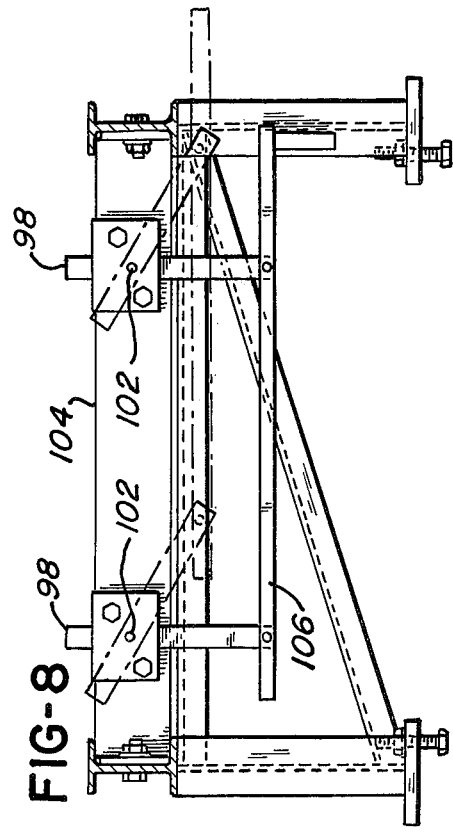
FIG-9

PIPE TESTING SYSTEM

BACKGROUND OF THE INVENTION

Precast concrete pipes of various lengths and diameters are widely used in construcing sewer system. Traditionally, such pipe has been tested on a random selection basis to provide some approximate indication of the quality of a particular batch of pipes. Testing on other than a random basis heretofore has been considered too time consuming for the average installation and it has only been in unusual instances that an attempt is made to test each pipe section.

Additionally, it is desirable to test a pipe in different ways under different circumstances. For example, a simple positive air pressure test will often be sufficient, while in other cases it may be desirable to apply a negative pressure. For example, a positive air pressure would be used ordinarily up to about 3½ psi. Above this pressure there is an appreciable risk of explosion. However, when testing under vacuum the negative pressure imposed on the interior of the pipe may safely be increased to approximately 10 psi. Therefore, where a higher than normal test pressure is desired, vacuum testing may be used in place of positive pressure testing. Additionally, if the interior of the pipe is placed under a negative pressure and a leak is observed in the pipe, patching compound can be applied at the point of leakage with the patching compound being drawn into the crack or other defect in the pipe responsible for the leak.

Since concrete sewer pipe will ordinarily be used for handling liquid flow, some municipalities specify that the pipe should be hydrostatically tested rather than tested with air pressure. Therefore, in some instances it is desirable to be able to impose a positive liquid pressure on the interior of the pipe for test purposes.

Despite the fact that each of the three types of pipe pressure testing may be desirable and, in fact, necessary, under certain conditions, prior art testing systems, insofar as applicant is aware, have been limited to apparatus for testing in just one mode.

Further, prior art systems, regardless of which mode they are adapted to operate in, were difficult and time consuming to set up and operate and hence, adapted only, in most cases for random or spot checking.

An important aspect in a sewer system is the integrity of the pipe joints. Most concrete sewer pipe is of the bell and spigot type, with the spigot end of the pipe being formed to be received in the bell end of an adjacent pipe with a gasket received between the outer surface of the spigot and the inner surface of the bell. Therefore, despite the fact that a pipe is otherwise acceptable, leakage may still occur because of a defective bell or spigot on the pipe. In prior art testing systems, however, the ends of a pipe section to be pressurized are merely closed with no attempt to rely upon the proper formation of the bell and spigot ends of the section to form a pressure type joint. Therefore, a pipe might pass a pressure test under test conditions, but yet would not be acceptable under actual operating conditions because of a defective bell or spigot.

SUMMARY OF THE INVENTION

The present invention provides a pipe testing system designed to operate on a high volume basis to check both the pipe sections per se and the integrity of the joint ends thereof and provide selective testing with either positive or negative air pressure or positive liquid pressure.

The system of the present invention includes a pipe testing station and a trackway leading from a supply of pipe sections to be tested to the testing station. As pipes are rolled onto the trackway a centering section of the trackway aligns the pipe in proper relation to the test station postioned downstream thereof. Stop members are associated with the trackway to arrest the rolling movement of a pipe section moving along the trackway and position it properly with respect to the test station.

The test station includes an overhead rail, which is aligned with the pipe section being tested when the pipe section has been positioned properly at the test station. The overhead rail carries a pair of carriage members, each of which has depending portions carrying adapters. One of the adapters is complementary to the bell end of a pipe while the opposing adapter is complementary to the spigot end of the pipe.

A control system is provided for clamping a pipe section between the adapters and, if the pipe joint ends are sound, forming an air tight seal with the pipe ends. An additional control is provided for selecting whether the interior of the pipe is to be tested with positive air pressure, negative air pressure or positive liquid pressure. This not only provides the capability of testing in different modes, but also permits some repair of pipe sections which fail the test in, for example, the positive air pressure mode.

For example, if a pipe section fails to check out when tested under positive air pressure the test can be reconducted under positive liquid pressure or, if a pipe section fails a positive air pressure check it can then be checked with negative air pressure, and a patching compound applied to the pipe at the point of leakage so that it is sucked into the crack or other defect causing the leak.

Regardless of the mode in which the pipe is tested, a control circuit is provided which gives an indication when a first maximum pressure is reached and then discontinues further pressurization, whether positive or negative, gaseous or liquid. This also activates a timer which is utilized to check the time interval it takes the pressure within the interior of the pipe to change from the maximum pressure to some preselected second pressure.

Thus, a quick positive check is provided by merely setting a minimum time interval for the pressure within the pipe to bleed down to or up to the second value, with all pipe sections in which the pressure changes a predetermined amount within that time interval being considered defective. With this system each pipe may be checked, for example, for a 1 psi pressure differential, with all pipes which take over, for example, 30 seconds, to change pressure being considered acceptable. It will be seen, therefore, that the pipe testing may be conducted on a relatively high volume basis.

In addition to providing a system for testing pipe on a relatively high volume basis under different modes of testing, the system of the present invention is also adapted to test pipe of various diameters and lengths. Thus, the positions of the carriages carrying the pipe adapters may be adjusted along the overhead rail depending upon the length of the pipe to be tested. The distance of the overhead rail above the trackway leading to the testing station can also be varied to accommodate pipes of different diameters. Therefore, the present invention provides a system for high volume testing of concrete pipe of various lengths and diameters and their end joints under various modes of testing.

BRIEF DESCRIPTION OF THE DRAWINGS

FIG. 1 is an elevational view of the testing system of the present invention with portions broken away and with a pipe section shown in position at the test station;

FIG. 2 is a view taken on line 2—2 of FIG. 1;

FIG. 3 is a cross-sectional view taken on line 3—3 of FIG. 1;

FIG. 4 is a view taken on line 4—4 of FIG. 1;

FIG. 5 is a view taken on line 5—5 of FIG. 1;

FIG. 6 is a plan view of the pipe trackway of the present invention;

FIG. 7 is a view taken on line 7—7 of FIG. 1;

FIG. 8 is a view taken on line 8—8 of FIG. 7;

FIG. 9 is a view taken substantially on line 9—9 of FIG. 7, although, since the trackway is symmetrical, only one half thereof is shown in FIG. 9;

DESCRIPTION OF THE PREFERRED EMBODIMENTS

Figure 10:
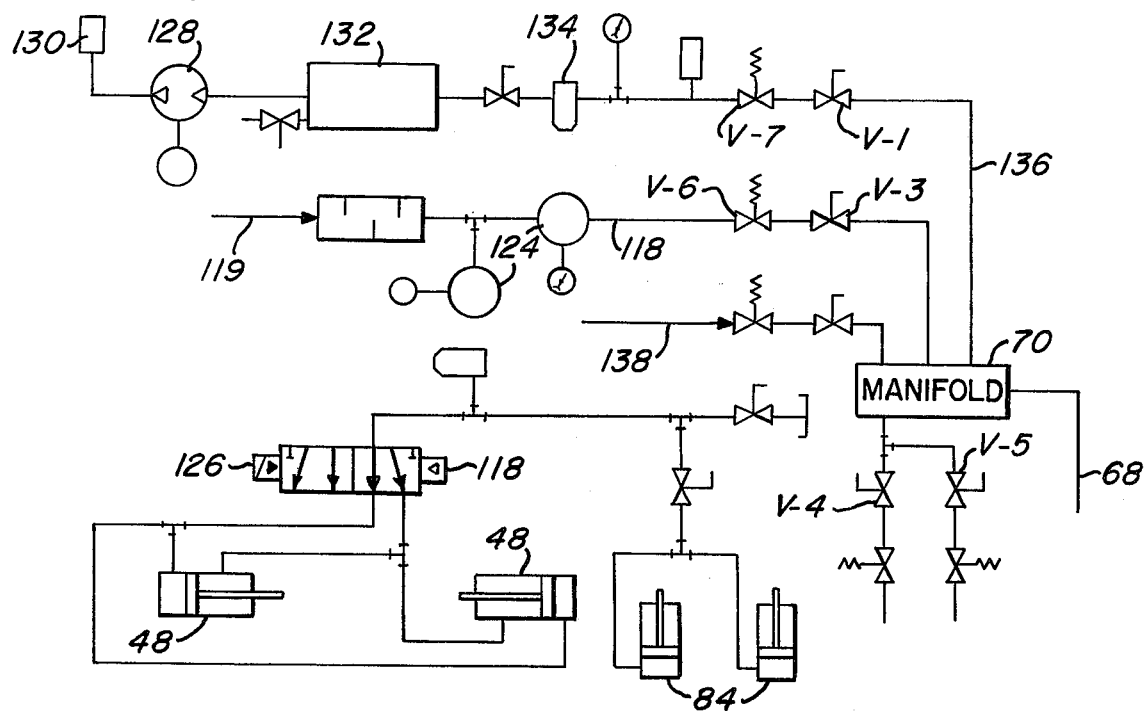
FIG. 10 is a flow diagram showing the various pressure testing circuits.

With reference to FIG. 1 of the drawings, it will be seen that a pipe testing system in accordance with the present invention includes a pipe testing station 10 and a trackway 12 for feeding pipes, as at 14, to the pipe testing station 10. Testing station 10, as seen in FIGS. 1 through 5 of the drawings, includes an overhead rail 16 and a pair of end supports 18. Each end support 18 includes a spaced pair of channel members 20 interconnected by suitable cross members, as at 22, and a pair of outwardly and downwardly extending braces 24 interconnected at their lower ends by means of a bottom cross member 26.

Carriages 28 are mounted on the overhead rail 16 and each carriage includes inner and outer members 30 and 32 attached to a lower flange 34 of the rail 16. Inner member 30 is provided with a pair of spaced rollers 36 to permit adjustment of member 30 along the flange 34 and clamp members 38 for locking member 30 in a desired position. Outer member 32 has spaced upper and lower rollers 40 and 42, respectively, as best seen in FIG. 3 of the drawings, although member 32 does not include anchoring means.

Both members 30 and 32 have downwardly depending portions 44 and 46, respectively, and a piston and cylinder, which may be pneumatic or hydraulic and is referenced in its entirety by number 48, pivotally attached to members 44 and 46, as at 50 and 52, respectively. The left hand member 46 carries a spigot adapter 54 for engagement with the spigot end 56 of a pipe section 14 while the right hand member 46 carries a bell adapter 58 for engagement with the bell end 60 of a pipe section 14.

The bell adapter 58 includes a vent 62 interconnected by the conduit 64 to suitable valving and a connection 66 through the conduit 68 to a manifold 70. It will also be noted that the bell adapter 58 includes a circumferential groove adapted to receive a gasket 72 while the spigot adapter 54 includes a manually actuated vent 74.

Each of the channels 20 is provided with a series of vertically spaced openings 76 through aligned ones of which a pin 78 may be received. Pin 78, as seen in FIG. 2 of the drawings, is provided with a pair of relieved portions 80 adjacent each of its ends and a handle 82 for positioning the pin 78 in selected openings. A piston and cylinder 84, which may be pneumatic or hydraulic and which has an outwardly projecting piston rod 86', is mounted on the cross member 22 of each of the end supports 18 for a purpose to be presently described.

The trackway 12 includes a pair of spaced apart tracks 86 formed from I-beams interconnected by suitable bracing, as at 88, and extending perpendicular to the overhead rail 16. Adjacent the upstream end of the I-beams 86, a pair of spaced apart rollers 90 are positioned for rotation about axes extending parallel to tracks 86.

A pair of deflectors 92 are also mounted adjacent the upstream ends of tracks 86 with the transverse position of the deflectors 92 being adjustable as indicated in phantom lines in FIG. 6 of the drawings. Each of the deflectors 92 includes an outwardly flaring portion 94 and a portion 96 extending parallel to tracks 86.

Two spaced pairs of stops 98 are also mounted on the trackway 12 with one pair of stops being positioned adjacent the deflectors 92 while a second set are positioned adjacent the test station 10 in a position such that a pipe section, as shown in phantom lines in FIG. 7, engaging the downstream stops 98, will be substantially aligned with the overhead rail 16.

Additionally, the downstream stops 98 are provided with adjustment means 100 to permit a limited degree of movement with respect to the tracks 86. Each of the stops 98 is pivotally mounted, as at 102, to cross members 104 and, by means of the linkage 106, may be moved from the solid line position shown in FIG. 8 to the position shown in phantom lines.

With the above construction, it will be seen that pipe sections to be tested are positioned on the upstream end of the trackway 12 and rolled along tracks 86 in a downstream direction towards the test station 10. If the pipe sections are not positioned on tracks 86 in the manner desired a flared portion 94 of one of the deflectors 92 will engage an end of the pipe section and shift it axially thereof through rotation of the rollers 90, so that by the time the pipe section reaches the portions 96 of the deflectors, it is positioned properly with respect to the tracks 86 and the test station 10 at the downstream ends thereof.

The pipes will be stopped adjacent upstream ends of the tracks 86 by means of the stops 98. When the test station operator is ready for another pipe section, the stops are manually lowered by moving them to the phantom line position shown in FIG. 8 of the drawings and the pipe section is rolled along the tracks 86 to the downstream stops 98.

Depending upon the length of pipe being tested, the deflectors 92 have been adjusted with respect to the tracks 86. Similarly, the members 30 have been moved along the overhead rail 16 to the proper position for the length of pipe being checked and locked at this position by means of the clamps 38. The double acting pistons and cylinders 48 have been expanded to move the members 46 to the phantom line position shown in FIG. 1 of the drawings.

Additionally, the hydraulic pistons and cylinders 84 have been actuated to engage the lower flange 34 of the overhead rail 16 and then position the overhead rail at the desired height above the trackway 12 for the particular diameter pipe being tested. Thereafter, the pin 78 is inserted through the proper pair of aligned holes 76 to support the overhead rail 16 at that desired height with the relieved portions 80 of the pin 78 locking the pin in position.

Additionally, the position of the downstream stops 98 has been adjusted by means of adjusting means 100 in accordance with the diameter of the pipe to be checked. With all elements of the system adjusted for the length and diameter of pipe to be tested, and with the gasket 72 cemented in the annular groove on the bell adapter 58, a second gasket 108 is mounted on the spigot end 56 of the pipe section 14.

Figure 11:
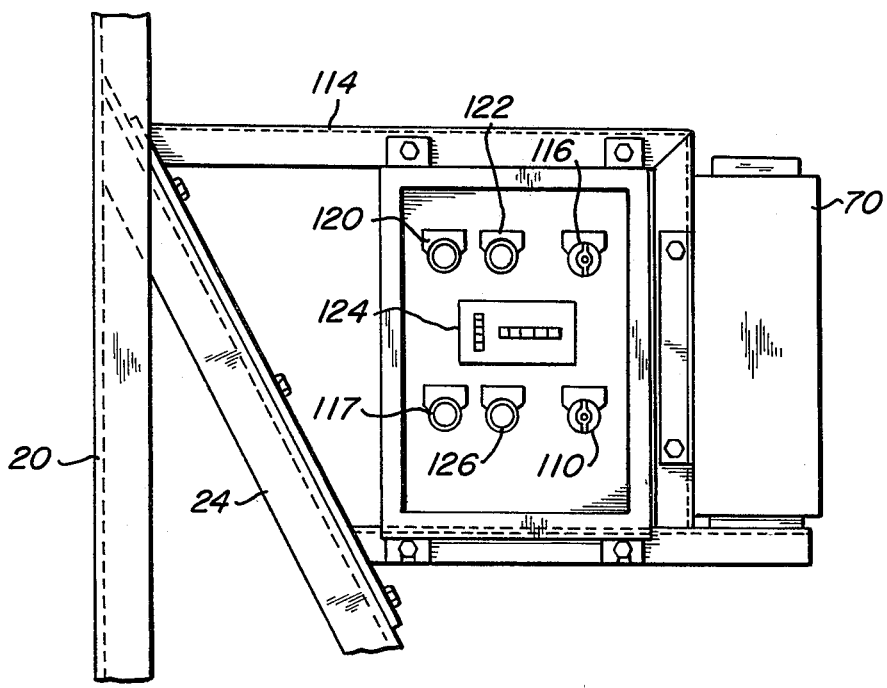
FIG. 11 is a view of the control panel of the present invention.

The pipe test station is then switched on by means of the off-on switch 110 on the control panel 112 shown in FIG. 11 of the drawings. Control panel 112 may conveniently be mounted by struts 114 on one of the brace members 24 at the right hand end of the station 10 as seen in FIG. 1 of the drawings, with the manifold 70 mounted outwardly thereof.

Next the mode of testing is selected by means of the four-position switch 116. Switch 116 will have OFF, VACUUM, AIR, and WATER positions. If the pipe is to be air tested, and with reference to the flow diagram of FIG. 10, the valves V1, V2 and V5 are closed manually, while valves V3 and V4 are opened manually. The gaskets 72 and 108 are then lubricated and button 117, labelled CLAMP, is depressed.

This directs fluid to one side of each of the pistons and cylinders 48 to cause the members 32 to ride along the flange 34 of rail 16 towards each other, clamping the pipe section 14 between the bell and piston adapters 58 and 54, respectively. Switch 116 is then switched from the OFF position to the AIR position. This opens solenoid valve V6 in a pressure line 118 leading from any convenient source 119, such as shop air, and passing through pressure regulator 124. This also closes vent 62, vent 74 having been manually closed for the air pressure check.

Pressurized air is then pumped through valve V6 and V3 and through the manifold 70 and line 68 to the interior of the pipe section 14, pressurizing the pipe section. When the pressure in the pipe section reaches some preselected flow, such as 3½ psi, normally closed contacts in switch 2, circuit 1 (FIG. 12) open and normally open contacts close, actuating relay CR2 which is of the self-holding type. This provides a visual signal, such as a green light 120, and starts the timer 124 (FIG. 11 of the drawings). This also stops the flow of pressurized air into the pipe section 14, and, in the event that the pipe or pipe joint leaks, allows the pressure in the pipe to begin to bleed down.

Figure 12:
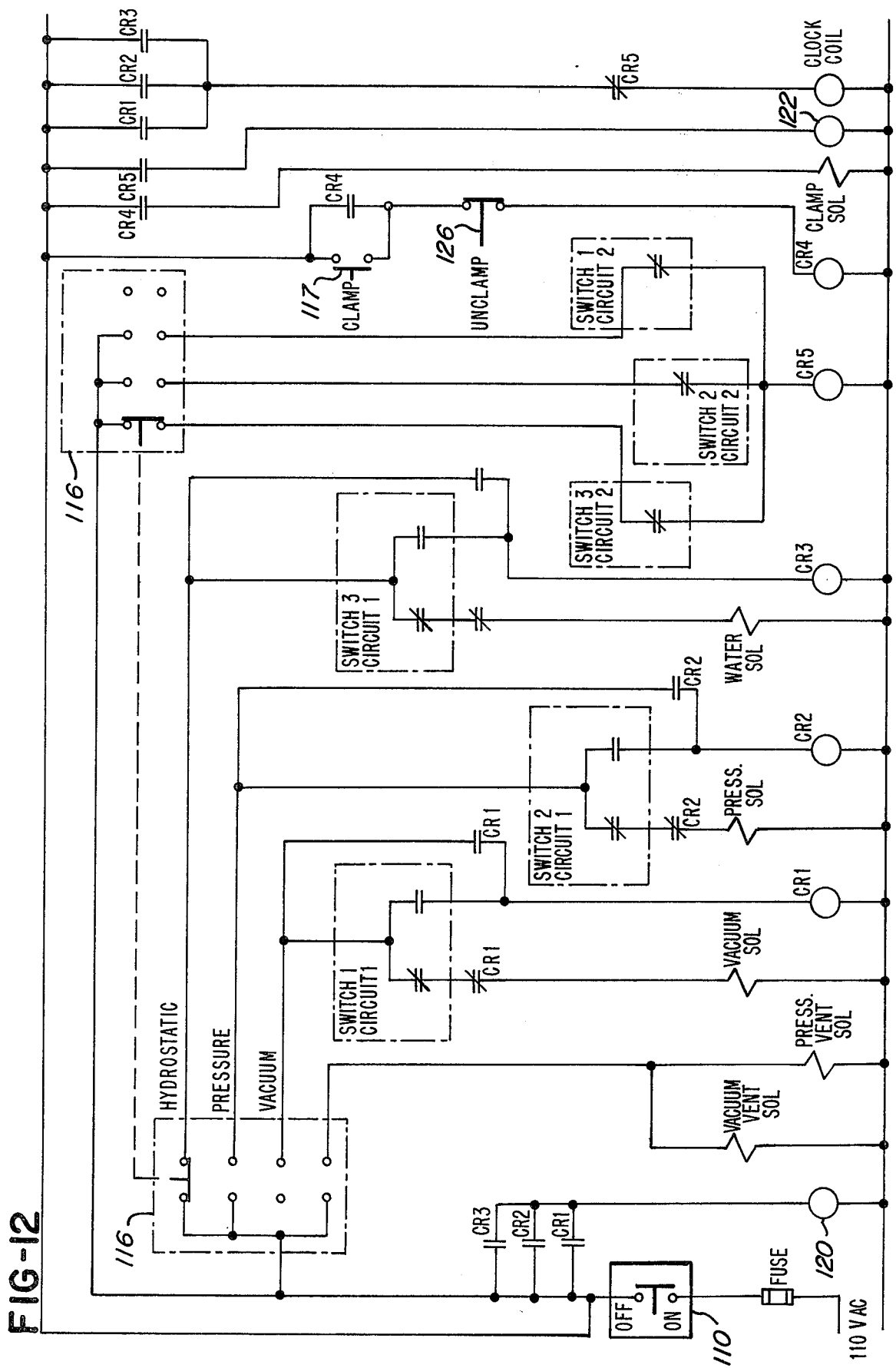
FIG. 12 is an electrical schematic diagram.

When the pressure in the pipe hits a preset low point, such as 2½ psi, the normally open contacts in circuit 2 of switch 2 close and provide a visual signal, such as a red light 122 (FIG. 12 of the drawings). If the time interval indicated by the timer 20 is more than some preselected minimum time, for example 30 seconds, the pipe section will be considered to have passed the test and switch 116 can be moved from the AIR position to the OFF position.

When the pressure in the pipe reaches zero as indicated by the gauge 124 (FIG. 1) the UNCLAMP button 126 located on the control panel 112 can be depressed, causing fluid to flow to the opposite sides of the piston and cylinder 48 moving the members 32 outwardly to their phantom line positions in FIG. 1 of the drawings and releasing the pipe section. The stops 98 may then be depressed to allow the successfully tested pipe to roll away from test station 10.

If the pipe pressure drops too quickly the normal procedure would be to vacuum test the pipe, then switch the test mode back to AIR for rechecking. This will sometimes improve the bulkhead seal, and the pipe will then pass the positive air test. In a vacuum test the valves V2, V3 and V4 are closed and the valves V1 and V5 are opened. The vacuum pump 128 having, if desired, a muffler 130, is started and, after preliminary positioning of a pipe section at the test station the CLAMP button 117 is again depressed.

Switch 116 is then turned to the VACUUM position, beginning the vacuum test procedure. This opens valve V7, allowing a vacuum to be drawn on the interior of the pipe. When the negative pressure reaches a preset value, switch 1, circuit 1 is actuated. This in turn activates relay CR1, lights the green light 122 and starts the timer 124.

The vacuum pump 128, acting through a vacuum tank 132, filter 134, valve V7 and the vacuum line 136, will cease to draw a vacuum and the pressure within the pipe section will bleed towards atmospheric pressure. After sosme preselected pressure differential, normally open contacts in the circuit 2 of switch 1 will close, lighting the indicator 122. If it is desired to terminate the testing at this point, the switch 116 is turned from VACUUM to the OFF position and button 126 is pushed to unclamp the pipe after gauge 124 reads zero.

In some instances it will be desired, as noted above, to provide hydrostatic testing. In a hydrostatic test, valves V1, V3 and V5 are closed and valves V2 and V4 are opened. The CLAMP button 117 is then depressed to engage a pipe section by means of the bell and spigot adapters 58 and 54, respectively. The vent 74 in the spigot adapter is then opened manually and switch 116 turned from the OFF to the WATER position.

This causes water to flow through line 138 and valves V8 and V2 to the manifold 70 and thence through line 68 to the interior of the pipe. When water flows from valve 74 this valve is manually closed, allowing hydrostatic pressure to build up within the pipe. When the pipe is pressurized it can be observed for leaks.

If pressure bleeds from the pipe before observation thereof is complete, the pressure within the pipe can be brought back by switching to the AIR position momentarily and then back to the WATER position. When the test is complete, the pipe is depressurized by turning switch 116 to the OFF position. This will allow water to exhaust through valve V4 and, when the pressure within the pipe reaches zero the button 126 may be depressed to remove the pipe from the test station.

From the above it will be seen that the present invention provides a pipe testing system which is fully adjustable to accommdate pipe of various lengths and diameters in the positive or negative air pressure modes or under hydrostatic pressure conditions and on a high volume basis.

While the form of apparatus herein described constitutes a preferred embodiment of the invention, it is to be understood that the invention is not limited to this precise form of apparatus, and that changes may be made therein without departing from the scope of the invention.

What is claimed is:

1. A pipe testing system for testing a pipe section having a bell end and a complementary spigot end comprising:
 a. rail means extending parallel to the axis of said pipe section being tested,
 b. a bell adapter complementary to and adapted to engage said bell end of said pipe section and a spigot adapter complementary to and adapted to engage said spigot end of said pipe section whereby joint testing may be effected simultaneously with pipe testing,
 c. carriage means carrying said adapters and movable along said rail means,
 d. means for moving said carriage means along said rail means,
 e. means for the selective application to the interior of said pipe section of:
  i. a negative pressure, or
  ii. a positive pressure,
 f. means for venting the interior of said pipe section while said pipe section is engaged by said adapters, and
 g. means for releasing said adapters from engagement with said ends of said pipe section after testing thereof.

2. A pipe testing system for testing a pipe section comprising:
 a. adapters adapted to engage open ends of said pipe section,
 b. rail means extending parallel to said pipe section to be tested,
 c. carriage means carrying said adapters and mounted for movement along said rail means,
 d. means for moving said carriage means along said rail means to engage said ends of said pipe section with said adapters,
 e. means for selective application to the interior of said pipe section of:
  i. a negative pressure, or
  ii. a positive pressure,
 f. means for venting the interior of said pipe section while said pipe section is engaged by said adapters, and
 g. means for releasing said adapters from engagement with the ends of said pipe section after testing thereof.

3. The system of claim 2 further comprising:
 a. means for adjusting said moving means and said carriage means longitudinally of said rail means to permit pipe sections of different lengths to be tested.

4. The system of claim 2 further comprising:
 a. means for moving said rail means perpendicularly to its length to permit pipe sections of different diameters to be tested.

5. The system of claim 2 wherein said rail means comprises:
 a. overhead rail means adapted to extend above a pipe section being tested.

6. The system of claim 4 further comprising:
 a. means for adjusting said moving means and said carriage means longitudinally of said rail means to permit pipe section of different lengths to be tested.

7. The system of claim 2 further comprising:
 a. track means for conveying pipe sections to said adapters.

8. The system of claim 7 further comprising:
 a. stop means associated with said track means for positioning pipe sections at said adapters for engagement thereby.

9. The system of claim 2 wherein said means for selection application of a positive pressure to the interior of a pipe section comprises means for selective pumping into the interior thereof either:
 a. a gas under pressure, or
 b. a liquid under pressure.

10. The system of claim 2 wherein said pressure application means comprises:
 a. a manifold,
 b. means placing said manifold in fluid communication with the interior of a pipe section through said adapters, and
 c. means associated with said manifold for placing said manifold in communication selectively with either:
  i. a source of negative fluid pressure, or
  ii. a source of positive fluid pressure.

11. The system of claim 10 wherein said means for placing said manifold in communication selectively with a source of positive fluid pressure comprises means for placing said manifold in communication with either:
 a. a source of gas under pressure, or
 b. a source of liquid under pressure.

12. The system of claim 2 further comprising:
 a. means for monitoring the pressure in the interior of a pipe section to which pressure has been applied.

13. The system of claim 12 wherein said monitoring means comprise:
 a. first signal means for indicating when the pressure applied to the interior of a pipe section reaches a first value,
 b. second signal means for indicating when the pressure applied to the interior of a pipe section has changed from said first value to a second value, and
 c. timer means for indicating the elapsed time between the time said first signal means is actuated and the time said second signal means is actuated.

14. A pipe testing system comprising:
 a. means for engaging the open ends of a pipe section to be tested,
 b. means associated with said engaging means for selective application to the interior of said pipe section of:
  i. a negative pressure, or
  ii. a positive pressure,
 c. means for venting the interior of said pipe section while said pipe section is engaged by said engaging means,
 d. means for releasing said engaging means from engagement with the ends of said pipe section after testing thereof,
 e. track means for conveying pipe section to said end engaging means,
 f. roller means positioned adjacent an upstream end of said track means in spaced relationship to said end engaging means,
 g. means mounting said roller means for rotation about axes parallel to said track means, h. deflector means positioned adjacent said roller means for aligning pipe sections with respect to said track means as pipe sections pass over said roller means.

15. A pipe testing system comprising:
a. a pipe trackway including pipe centering means adjacent one end thereof and stop means spaced from said centering means,
b. an overhead rail positioned above and crossing said track means substantially perpendicularly thereto adjacent said stop means,
c. a pair of spaced carriage members having downwardly depending portions mounted on said rail for movement therealong,
d. complementary bell and spigot adapter plates mounted on said downwardly depending portions in opposed relationship to each other for engagement with bell and spigot ends of a pipe to be tested,
e. a piston and cylinder mounted on said overhead rail and connected to each of said carriages to shift said carriages along said rail to clamp a pipe section between said adapters,
f. means for adjusting the position of each of said pistons and cylinders and said carriages along said overhead rail to accommodate pipe sections of different lengths,
g. means for shifting said overhead rail toward and away from said trackway to accommodate pipe sections of different diameters,
h. a manifold having means for communicating with the interior of a pipe section through one of said adapter plates,
i. means for applying through said manifold to the interior of a pipe section engaged by said adapter plates either:
  i. a negative pressure,
  ii. a positive gas pressure, or
  iii. a positive water pressure,
j. pressure sensitive means mounted in one of said adapter plates to sense pressure changes in the interior of a pipe section being tested,
k. signal means to indicate changes in pressure in the interior of a pipe being tested, and
l. automatic timer means for determining the elapsed time from one predetermined pressure valve to a second predetermined pressure valve.

* * * * *